(12) United States Patent
Wiggs (10) Patent No.: US 7,080,524 B2
(45) Date of Patent: Jul. 25, 2006

(54) ALTERNATE SUB-SURFACE AND OPTIONALLY ACCESSIBLE DIRECT EXPANSION REFRIGERANT FLOW REGULATING DEVICE

(75) Inventor: B. Ryland Wiggs, 425 Sims La., Franklin, TN (US) 37069

(73) Assignee: B. Ryland Wiggs, Franklin, TN (US)

( * ) Notice: Subject to any disclaimer, the term of this patent is extended or adjusted under 35 U.S.C. 154(b) by 0 days.

(21) Appl. No.: 10/842,672

(22) Filed: May 10, 2004

(65) Prior Publication Data
US 2004/0206103 A1    Oct. 21, 2004

Related U.S. Application Data

(63) Continuation-in-part of application No. 10/335,514, filed on Dec. 31, 2002, now Pat. No. 6,751,974.

(51) Int. Cl.
*F25D 23/12* (2006.01)
(52) U.S. Cl. ........................................ 62/260; 62/324.6
(58) Field of Classification Search .................. 62/260, 62/324.4, 324.6, 509, 526, 527, 524; 165/45
See application file for complete search history.

(56) References Cited

U.S. PATENT DOCUMENTS

| | | | |
|---|---|---|---|
| 4,741,388 A | 5/1988 | Kuroiwa | |
| 5,038,580 A * | 8/1991 | Hart | 62/324.6 |
| 5,313,804 A * | 5/1994 | Kaye | 62/160 |
| 5,461,876 A | 10/1995 | Dressler | |
| 5,564,282 A * | 10/1996 | Kaye | 62/160 |
| 5,623,986 A | 4/1997 | Wiggs | |
| 5,651,265 A * | 7/1997 | Grenier | 62/260 |
| 5,758,514 A * | 6/1998 | Genung et al. | 62/471 |
| 5,771,700 A * | 6/1998 | Cochran | 62/117 |
| 5,816,314 A | 10/1998 | Wiggs et al. | |
| 5,875,644 A * | 3/1999 | Ambs et al. | 62/324.6 |
| 5,946,928 A | 9/1999 | Wiggs | |
| 6,615,601 B1 * | 9/2003 | Wiggs | 62/235.1 |

* cited by examiner

*Primary Examiner*—Melvin Jones
(74) *Attorney, Agent, or Firm*—Waddey & Patterson P.C.; Philip E. Walker

(57) ABSTRACT

A sub-surface direct expansion geothermal heat exchange unit, which can be placed in sub-surface ground and/or water, consisting of at least one smaller interior diameter refrigerant liquid/fluid transport line with an optional vertically oriented U bend at the bottom, operatively connected to at least one larger interior diameter refrigerant liquid/fluid transport line, with at least one refrigerant flow metering device, designed to the system's compressor's BTU design capacity, which is optionally accessible, installed in the liquid/fluid line at one of an above-surface location and at the sub-surface point near to where the liquid/fluid line connects with the vapor/fluid line, for use when the system is operating in the heating mode, together with a refrigerant flow metering device by-pass means so as to enable additional refrigerant fluid flow at least one of around and past the refrigerant metering device when the system is operating in the cooling mode.

32 Claims, 5 Drawing Sheets

FIG. 9

ALTERNATE SUB-SURFACE AND OPTIONALLY ACCESSIBLE DIRECT EXPANSION REFRIGERANT FLOW REGULATING DEVICE

This application is a continuation-in-part of U.S. patent application Ser. No. 10/335,514 filed Dec. 31, 2002, entitled "Sub-Surface And Optionally Accessible Direct Expansion Refrigerant Flow Regulating Device", which is hereby incorporated by reference in its entirety. All patents, patent applications and publication disclosed or discussed herein are hereby incorporated by reference in their entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to an improved sub-surface, or in-ground/in-water, heat exchange means incorporating a sub-surface heating mode refrigerant flow regulating device and a cooling mode refrigerant flow regulating device by-pass means, so as to enable additional refrigerant flow around the regulating device in the cooling mode, for use in association with any direct expansion heating/cooling system, or partial geothermal heating/cooling system, utilizing sub-surface heat exchange elements as a primary or supplemental source of heat transfer.

Ground source/water source heat exchange systems typically utilize fluid-filled closed loops of tubing buried in the ground, or submerged in a body of water, so as to either absorb heat from, or to reject heat into, the naturally occurring geothermal mass and/or water surrounding the buried or submerged tubing. Water-source heating/cooling systems typically circulate, via a water pump, water, or water with anti-freeze, in plastic underground geothermal tubing so as to transfer heat to or from the ground, with a second heat exchange step utilizing a refrigerant to transfer heat to or from the water, and with a third heat exchange step utilizing an electric fan to transfer heat to or from the refrigerant to heat or cool interior air space.

Direct expansion ground source heat exchange systems, where the refrigerant transport lines are placed directly in the sub-surface ground and/or water, typically circulate a refrigerant fluid, such as R-22, in sub-surface refrigerant lines, typically comprised of copper tubing, to transfer heat to or from the sub-surface elements, and only require a second heat exchange step to transfer heat to or from the interior air space by means of an electric fan. Consequently, direct expansion systems are generally more efficient than water-source systems because of less heat exchange steps and because no water pump energy expenditure is required. Further, since copper is a better heat conductor than most plastics, and since the refrigerant fluid circulating within the copper tubing of a direct expansion system generally has a greater temperature differential with the surrounding ground than the water circulating within the plastic tubing of a water-source system, generally, less excavation and drilling is required, and installation costs are lower, with a direct expansion system than with a water-source system.

While most in-ground/in-water heat exchange designs are feasible, various improvements have been developed intended to enhance overall system operational efficiencies.

Several such design improvements, particularly in direct expansion/direct exchange geothermal heat pump systems, are taught in U.S. Pat. No. 5,623,986 to Wiggs; in U.S. Pat. No. 5,816,314 to Wiggs, et al.; in U.S. Pat. No. 5,946,928 to Wiggs; and in U.S. Pat. No. 6,615,601 B1 to Wiggs, the disclosures of which are incorporated herein by reference. Such disclosures encompass both horizontally and vertically oriented sub-surface heat geothermal heat exchange means.

Other predecessor vertically oriented geothermal heat exchange designs are disclosed by U.S. Pat. No. 5,461,876 to Dressler, and by U.S. Pat. No. 4,741,388 to Kuriowa. Dressler's '876 patent teaches the utilization of several designs of an in-ground fluid supply and return line, with both the fluid and supply lines shown as being the same size, and not distinguished in the claims, but neglects to insulate either the fluid return line or the fluid supply line, thereby subjecting the heat gained or lost by the circulating fluid to a "short-circuiting" effect as the supply and return lines come into close proximity with one another at various heat transfer points. Dressier also discloses the alternative use of a pair of concentric tubes, with one tube being within the core of the other, with the inner tube surrounded by insulation or a vacuum. While this multiple concentric tube design reduces the "short-circuiting" effect, it is practically difficult to build and maintain and could be functionally cost-prohibitive, and it does not have a dedicated liquid line and a dedicated vapor line. Kuriowa's preceding '388 patent is similar to Dressler's subsequent spiral around a central line claim, but better, because Kuriowa insulates a portion of the return line, via surrounding it with insulation, thereby reducing the "short-circuiting" effect. However, Kuriowa does not have a dedicated liquid line and a dedicated vapor line. The lowermost fluid reservoir claimed by Kuriowa in all of his designs can work in a water-source geothermal system, but can be functionally impractical in a deep well direct expansion system, potentially resulting in system operational refrigerant charge imbalances, compressor oil collection/retention problems, accumulations of refrigerant vapor pockets due to the extra-large interior volume, and the like. Kuriowa also shows a concentric tube design preceding Dressler's, but it is subject to the same problems as Dressler's. Further, both Dressler's and Kuriowa's designs are impractical in a reverse-cycle, deep well, direct expansion system operation since neither of their primary designs provide for, or claim, an insulated smaller interior volume sized liquid line and an un-insulated larger interior volume sized vapor line, which are necessary to facilitate the system's most efficient operational refrigerant charge and the system's compressor's efficient refrigerant supply and return capacities.

Generally, a design which insulates the supply line from the return line and still permits both lines to retain natural geothermal heat exchange exposure, such as a thermally exposed, centrally insulated, geothermal heat exchange unit, as taught by Wiggs in U.S. patent application Ser. No. 10/127,517, which is incorporated herein by reference, would be preferable over non-insulated lines and over designs which insulate a portion of one sub-surface line. However, while Wiggs' '517 Application is an improvement over prior art, in a sub-surface soil application, it could still be subject to some minor short-circuiting effects and to some potentially adverse vapor formation in the liquid line at undesirable locations or times.

In direct expansion applications, supply and return refrigerant lines may be defined based upon whether they supply warmed refrigerant to the system's compressor and return hot refrigerant to the ground to be cooled, or based upon the designated direction of the hot vapor refrigerant leaving the system's compressor unit, which is the more common designation in the trade. For purposes of this present invention, the more common definition will be utilized. Hence, supply and return refrigerant lines are herein defined based upon whether, in the heating mode, warmed refrigerant vapor is being returned to the system's compressor, after acquiring heat from the sub-surface elements, in which event the larger interior diameter, sub-surface, vapor/fluid line is the return line and evaporator, and the smaller interior diameter, sub-surface, liquid/fluid line, operatively connected from the interior air handler to the sub-surface vapor line, is the supply line; or whether, in the cooling mode, hot refrigerant vapor is being supplied to the larger interior diameter, sub-surface, vapor fluid line from the system's compressor, in which event the larger interior diameter, sub-surface, vapor/fluid line is the supply line and condenser, and the smaller interior diameter, sub-surface, liquid/fluid line is the return line, via returning cooled liquid refrigerant to the interior air handler, as is well understood by those skilled in the trade. In the heating mode the ground is the evaporator, and in the cooling mode, the ground is the condenser.

None of the above-said prior art addresses an improved means of designing a direct expansion system for a reverse-cycle heating/cooling system operation via insulating only one smaller interior diameter, sub-surface, line, designed primarily for liquid/fluid refrigerant transport, which smaller line may be utilized as a supply line in the heating mode and as a return line in the cooling mode, and of not insulating at least one, or two or more combined, larger interior diameter, sub-surface, lines, designed primarily for vapor/fluid transport, which can provide expanded surface area thermal heat transfer as return lines in the heating mode and as supply lines in the cooling mode. While at least two, larger combined interior diameter, vapor/fluid refrigerant transport lines, operatively connected to one, smaller interior diameter, liquid/fluid refrigerant transport line would generally be preferable because of the resulting expanded, and spaced apart, heat transfer surface contact area, instances may arise where only one, larger interior diameter, vapor/fluid refrigerant line, operatively connected to one, smaller interior diameter, liquid/fluid refrigerant line could also be preferable, or where a larger interior diameter vapor/fluid refrigerant line is spiraled around a centrally located, insulated, smaller diameter liquid/fluid refrigerant line could be preferable.

Where a close to zero-tolerance short-circuiting effect is desirable, and where the time and expense of constructing other designs, such as a concentric tube within a tube, or a spiraled single fluid return line and single fluid supply line of the same sized interior diameters, could be financially, or functionally and/or efficiently, prohibitive in a deep well direct expansion application, and where the thermal exposure area of a single geothermal heat transfer line, or tube, could be too centralized and too heat transfer restrictive, a system design improvement would be preferable which incorporated a cost-effective installation method, capable of operating in a reverse-cycle mode in a sub-surface direct expansion application, with close to zero-tolerance short-circuiting effect, with expanded sub-surface heat transfer surface area capacities, and with a liquid refrigerant trap means at the bottom of the sub-surface heat exchange lines to assist in preventing refrigerant vapor migration, from the refrigerant vapor line into the refrigerant liquid line, as is taught in Wiggs' pending U.S. patent application Ser. No. 10/251,190, which is incorporated herein by reference. However, none of the above-said prior art addresses the most efficient means of regulating the refrigerant fluid flow through the sub-surface refrigerant transport lines when a direct expansion system is operating in the heating mode, and of permitting optimum refrigerant flow rate around the regulating device when the reverse-cycle system is operating in the cooling mode.

Virtually all high-efficiency heat pump systems, including direct expansion heat pumps, utilize thermal expansion valves to regulate refrigerant flow through the evaporator, which is the exterior heat exchanger in the heating mode, and which is the interior air handler in the cooling mode. In the heating mode, for example, the thermal expansion valve is typically a self-adjusting thermal expansion valve, which valve will generally and ideally be situated in the refrigerant transport line at a point as close as possible to where the refrigerant fluid enters the evaporator, and which valve is operatively connected to a floating bulb. The floating bulb senses superheat levels and sends signals to the valve to adjust the refrigerant flow rate so as to obtain efficient system operation, depending on changing heating load and superheat conditions. The operation of self-adjusting thermal expansion valves is well understood by those skilled in the art.

While use of self-adjusting thermal expansion valves is appropriate in the heating mode for air-source and water-source heat pump systems, where the copper heat exchange tubing is all in relatively close proximity and where the valves are readily accessible for servicing, the common use of such self-adjusting thermal expansion valves in direct expansion heat pump systems can be relatively inefficient because the design refrigerant flow tubing length in the evaporator is often 100 feet, or more. Hence, in a typical direct expansion system, operating in the heating mode, any self-adjustment by the thermal expansion valve takes an inordinate amount of time to take effect and to be sensed by the valve. The valve, during the interim, continues to modulate and fluctuate refrigerant flow rates as it "hunts" for an optimum setting. This "hunting" results in periodic inefficient system operation and in periodic undesirable decreases in supply air temperatures.

The typical utilization of self-adjusting thermal expansion valves in the heating mode of direct expansion heat pump systems presents problems other than the "hunting" concerns. Namely, since such valves are bulky, and may periodically be in need of servicing or replacement, they must be installed in an accessible location, which has historically either been inside the compressor unit box, far from the actual evaporator, or near the ground surface, as close as possible to the point where the refrigerant enters the sub-surface evaporator, but still some distance away from the actual sub-surface evaporator. This is a problem because to operate at maximum efficiencies, the expansion device should generally be as close as possible to the actual evaporator.

Thus, the historical perception by some, that a self-adjusting thermal expansion valve should be utilized in the heating mode of a direct expansion system because it provides the highest operational efficiencies, is subject to serious question because of the necessary distance it must be located from the evaporator and because of inherent "hunting" problems. In fact, the longer and/or the deeper the sub-surface evaporator heat exchange lines are in a sub-surface direct expansion system, the greater the "hunting" problem becomes with a self-adjusting thermal expansion valve.

However, the use of a self-adjusting thermal expansion valve is generally always appropriate in the cooling mode of a high-efficiency heat pump system, regardless of the type of heat pump utilized, including direct expansion heat pumps, since the valve and the floating bulb, which are readily accessible for servicing, can generally always efficiently function together because of the relatively close proximity of the heat exchange tubing within the interior air handler.

One alternative method of regulating refrigerant flow in the heating mode of a direct expansion heat pump is to install a manually adjusting thermal expansion valve in lieu of a self-adjusting thermal expansion valve. Such a valve will eliminate hunting problems since it will not automatically adjust its own setting. However, such a manually adjusting valve generally must still be placed in an accessible location, which could be hundreds of feet above the actual evaporator in a DWDX application. Further, experience has shown that such a manually adjusting valve, when utilized in a near-surface direct expansion application (within 100 feet of the surface), typically requires at least two manual adjustments per year in order for the system to provide adequate and efficient heat. One such adjustment is required in the fall, at the beginning of the heating season, when the ground surrounding the sub-surface heat exchange tubing is relatively warm, as a result of summer conditions and the system's preceding cooling mode operation, which has been rejecting heat into the ground area surrounding the sub-surface heat exchange tubing. Generally, at least one other adjustment is required during the winter, as the ground surrounding the sub-surface heat exchange tubing has cooled down to winter-time operational temperatures as a result of heat being extracted by the system in its heating mode of operation. A reasonable manual expansion valve setting for a direct expansion system, when the sub-surface ground is warm, is not the same reasonable setting for when the ground is cool. The construction, the operation, and the reasonable settings of a manual adjusting thermal expansion valve is well understood by those skilled in the art.

Thus, the use of a manually adjusting thermal expansion valve in a direct expansion system, particularly in a DWDX system, while eliminating the hunting problem of a self-adjusting thermal expansion valve, has its problems. A manually adjusting valve is comparatively bulky, must be installed in an above ground and/or accessible location, and, as explained, typically must be adjusted and serviced at least twice per year.

Another alternative method of regulating refrigerant flow in the heating mode is to install a refrigerant fluid distributor with a fixed restrictive hole, or orifice, inside, and typically at the center of, a floating, bullet-shaped, finned, piston, which device is commonly referred to by several designations, such as a piston metering device, a single piston metering device, a floating piston assembly, and a pin restrictor. In the heating mode, the piston, within a casing/housing, moves toward a restrictive seal, which only permits refrigerant fluid flow through the piston hole, or orifice, in the center, thereby regulating the amount of refrigerant entering the evaporator. In the cooling mode, as the refrigerant flow changes direction, the piston moves back, or floats back, toward a less restrictive seal which permits refrigerant fluid flow through the hole, or orifice, as well as additionally through the gaps between the exterior fins on the piston. The specific construction and operation of piston metering devices, including the casings/housings within which they are enclosed, are well understood by those skilled in the art. Since a piston metering device has a fixed orifice, the refrigerant fluid flow rate cannot be adjusted, other than by pressure, so as to accommodate changing exterior load requirements, and has, therefore, generally been considered less efficient and has generally not been used in high-efficiency systems such as direct expansion heat pumps. Instead, many direct expansion heat pump systems utilize self-adjusting thermal expansion valves because of their well-known advantages and improved performance in other heat pump designs, which advantages have previously been commonly, although incorrectly, believed by some to equally apply in a direct expansion application.

In fact, a piston metering device can be more efficient in the heating mode of a direct expansion application than expansion valves, particularly in a DWDX application, because the ground at a depth of more than 100 feet is seasonally less affected by changing, and widely varying, above-ground, near surface, atmospheric temperatures, and hunting, or seasonal valve setting adjustments, for an optimum setting may not be necessary. A piston metering device will eliminate hunting concerns, and, since it is not bulky, can be installed in either an above-ground accessible location, or directly at the commencement of the evaporator segment of a sub-surface direct expansion system where efficiencies are generally best.

However, a reason exists for not using a conventional piston metering device alone in a reverse cycle direct expansion (also commonly referred to as direct exchange) heating/cooling system. Testing has also shown that a properly sized single piston metering devise in a Deep Well Direct eXpansion ("DWDX") system (deep well is herein defined as where sub-surface heat exchange lines are in excess of 100 feet deep), can impair the optimum refrigerant fluid flow when the system is operating in its reverse cycle cooling mode, as the available refrigerant fluid passageway through the hole in the center of the bullet, together with the available fluid passageway around the outside of the bullet through the fins, can be inadequate to maintain an optimum cooling design refrigerant fluid flow rate. This is because the added pressure, via gravity upon the liquid refrigerant in a DWDX application, can dictate the use of a slightly undersized conventional piston metering device, which device would normally be sized to match the compressor in a conventional heat pump application, but which slightly undersized device in a DWDX application, because of the additional liquid pressure, still achieves the compressor design flow rate in the heating mode, but which undersized device can be a potential impairment to the compressor design flow rate in the cooling mode.

Testing has also alternately shown that, in lieu of utilizing an slightly undersized conventional metering device in a DWDX system application so as to offset the additional liquid pressure, that a more conventionally sized (not undersized) metering device, when sized to match the system's compressor and not the system's design load capacity, can be utilized in a DWDX system application so long as the conventional refrigerant charge is one of slightly adjusted and slightly reduced, which, in an alternate manner, will provide the same desired ultimate effect of offsetting the additional liquid pressure present in the heating mode of a DWDX system. While conventional heating designs call for the metering device to match the system's design load capacity, testing has shown that, for optimum system performance, the metering device, for any direct expansion heat pump system operating in the heating mode, and particularly in a DWDX system, should be sized to match the system's compressor design capacity (meaning the compressor's design capacity in tons, where one ton equals 12,000 BTUs), and not the system's heating design capacity, which may differ.

Typically, should one elect to provide a conventionally sized metering device, sized to match the system's compressor and not the system's design load capacity as explained, rather than a slightly undersized metering device, some additional space will be automatically provided for the refrigerant to flow through and around the metering device in the cooling mode, as the orifice in the metering device will be larger.

If one elects to install a piston metering device in an above ground and/or an accessible location, the piston size can be easily changed to accommodate changing temperature conditions, or multiple such devices of varying sizes can be installed in series with a pressure and/or temperature means to automatically activate the preferred sized device and to deactivate the rest, by means of a remotely actuated valve such as a solenoid valves, or the like. The installation and operation of remotely actuated valves, such as solenoid valves, and the like, are well understood by those skilled in the art, and, therefore, are not shown herein.

Consequently, a means to provide an efficient refrigerant flow regulating device in a direct expansion, reverse-cycle, heating/cooling system, operating in the heating mode, without "hunting" problems, which device does not necessarily require maintenance access although it would preferably be accessible, which device is either in close proximity to the actual evaporator or which device can optionally compensate for significant changes in sub-surface temperature environments without the need for manual adjustments, and which device does not inhibit the full refrigerant flow in a reverse cycle cooling mode operation, would be preferable. The present invention provides a solution to these preferable objectives, as hereinafter more fully described.

SUMMARY OF THE INVENTION

It is an object of the present invention to further enhance and improve the efficiency of predecessor direct expansion, geothermal, reverse-cycle, heating/cooling system designs. This is accomplished by means of providing a piston metering device apparatus to efficiently regulate refrigerant fluid flow in the sub-surface evaporator segment of a direct expansion heating/cooling system when operating in the heating mode, which device can be optionally designed to accommodate significant sub-surface temperature fluctuations without manual adjustments, and which device does not necessarily require maintenance access although an access means would typically be preferable, while also providing alternative non-restrictive refrigerant fluid piston metering device by-pass means, so as not to inhibit reverse-cycle system operational efficiencies when the system is operating in the cooling mode. A piston metering device for use in the heating mode should be sized to match the system's compressor's design load capacity.

The present invention teaches to accomplish the stated preferable objectives by one of several alternative means. A first means consists of at least one smaller, preferably insulated, interior diameter liquid/fluid refrigerant transport line connecting to at least one larger interior diameter vapor/fluid refrigerant transport line at a point near the bottom of a direct expansion system borehole, where at least one single piston metering device, within a piston metering device casing/housing, is respectively installed at each respective point where a smaller interior diameter liquid/fluid line connects to at least one larger interior diameter vapor/fluid line. When the system is operating in the heating mode, this will provide for an even refrigerant fluid distribution, in a relatively stable sub-surface temperature environment, particularly at DWDX depths in excess of 100 feet, and will eliminate the need for an inefficient, "hunting", thermal expansion valve, which valve must be generally placed a significant, and operationally inefficient, distance away from the point of the actual respective evaporator/vapor line connection point so as to provide accessibility for service/repair work. In one alternative means of installing the single piston metering device at such location, the piston/pin restrictor would be permanently contained within its casing/housing, which ensures correct refrigerant flow metering in the heating mode via restricting the liquid refrigerant flow through the appropriately orifice in the center of the pin, and which ensures a sufficient refrigerant flow by-pass means in the cooling mode via extensions on the back of the pin's fins which seat on an enlarged tube end surface, as is well understood by those skilled in the art. In such an installation means, the single piston metering device/pin restrictor would not be accessible absent fully withdrawing the copper tubing within the well/borehole.

As a preferred alternative means of installing the single piston metering device at such a location near the bottom of a well/borehole, which permits the single piston metering device to be accessed, where at least one single piston metering device is respectively installed at each respective point where, or close to where, a smaller interior diameter liquid/fluid line connects to at least one larger interior diameter vapor/fluid line, would be to install only the lower half of the casing/housing for the one single piston metering device at a point immediately below (below means on the refrigerant outflow side of the pin restrictor in the heating mode) the metering device in the refrigerant liquid transport line at, or near, the bottom of a well/borehole, and to one of install no upper half of the casing/housing for the one single piston metering device and to install the upper half of the housing for the one single piston metering device at one of a point accessibly near to, and at a point above, the ground surface.

In such an alternate accessible means, such a pin restrictor metering device's pin restrictor must be installed within such a smaller interior diameter liquid/fluid refrigerant transport line that has an interior diameter greater than the sideways (horizontal) diameter of the single piston metering device's pin restrictor and that has an interior diameter smaller than the lengthwise (vertical) diameter of the single piston metering device's pin restrictor. For example, a single piston metering device's pin restrictor (such as, for example, an Aeroquip single piston metering device's pin restrictor) that has a side diameter, including its protruding fins, of about ¼ inch and a length of about ⅜, would easily slide up and down through a ⅜ outside diameter, refrigerant grade copper, refrigerant transport line/tube, which line/tube has a 0.03 inch thick wall thickness, but the pin restrictor could not turn sideways within the line/tube so as to foul the system's operation.

Thus, the single piston metering device/pin restrictor could be dropped into position, from the surface, through a cut/disconnected and exposed segment of the liquid line, with the exposed liquid line connected and sealed to its connecting liquid line segment after insertion of the pin restrictor. Further, the single piston metering device/pin restrictor can easily be forced out of its position near the bottom of the well/borehole by means of any pressurized fluid, such as one of compressed air and compressed gas (such as compressed nitrogen gas), by means of forcing/blowing the compressed fluid/air/gas from the surface, through an exposed segment of the opposite vapor line extending from the well/borehole, thereby forcing the pin restrictor out of the liquid line. Once the pin has been recovered and serviced, it is simply dropped back down (nose first) into the liquid line to its lower half of casing/housing. Next, both the exposed vapor line and the exposed liquid line are silver-soldered/sealed to their connecting respective vapor and liquid line segments after insertion of the pin restrictor; a vacuum is pulled; and the system is charged with refrigerant.

In such an optional pin restrictor recovery design, it is generally preferable, in a DWDX system design, to situate the lower half of the casing/housing for the single piston metering device/pin restrictor/pin at a point in the liquid refrigerant transport line/tube just before the U bend in the liquid line at the bottom of the well/borehole. This is because a typical and standard factory U bend, which is well understood by those skilled in the art, has too tight a radius turn for the pin restrictor to navigate. While the pin and its lower half of the casing/housing could always be placed at the point where the liquid line connects to the larger vapor line near the bottom of the well/borehole, such a location, for the restrictor pin to navigate the turn, would require a broader U bend in the liquid line at the bottom of the well/borehole, which, in turn may require a wider borehole at an additional cost that is impractical. Via placing the pin's lower half of the casing/housing at a point just above the bottom of the U bend in the liquid line at the bottom of the well/borehole, the pin restrictor has a fairly straight path into lower half casing/housing when inserted into the liquid line from the surface, and has a correspondingly relatively straight path when being forced out of the sub-surface tubing by means of compressed gas/air.

The pin restrictor, in such a recovery design, may be caught in a netting, which permits the compressed air/gas to escape but which holds/contains the pin restrictor. The netting, or the like, would be temporarily attached, via a cable clamp, a wire tie, or the like, to the open end of the liquid line exiting the well/borehole. Testing has shown that, via such a pin restrictor recovery/access method, when about 75 psi of dry nitrogen gas is applied to the vapor line, the pin restrictor will be forced up and out of the liquid line at a rate of about 10 feet per second.

Placing the pin restrictor at, or near, the point where the sub-surface liquid refrigerant transport line is coupled to the sub-surface vapor refrigerant transport line (which in a DWDX system application is at a point at, or near, the bottom of a well/borehole) is advantageous because it enables one to accurately predetermine the size of a DX system's receiver solely based upon the interior air handler's refrigerant content differential in system operation between one of the heating mode, the cooling mode, and the dehumidification mode, regardless of the depth of the well/borehole, and regardless of the length of the refrigerant line sets is leading from the interior system equipment to the deep well/borehole. As the optimum system heating mode charge of refrigerant will virtually always differ from the optimum cooling mode and dehumidification mode charge, a receiver must be designed to contain the respective optimum charge differentials for operation in the desired modes. Such charge differential will always be affected by differing line set distances (a line set is comprised of the liquid and vapor refrigerant transport lines connecting the system's interior equipment with the exterior heat exchange means, such as, for example, the refrigerant tubing within a well/borehole) and by differing well/borehole depths, which are dependant on sub-surface soil/rock/water heat conductivity rates.

Thus, if one places the pin restrictor at any point other than at or near the junction of the liquid line and the vapor line, at or near the bottom of a well/borehole, the appropriate receiver size cannot be determined until a point subsequent to the initial system installation, and standardized receivers cannot be pre-ordered and utilized since their sizing can virtually always vary. However, since the liquid line within the line set and within the well/borehole will always contain the same approximate amount of refrigerant in any desired mode of system operation when the pin restrictor is placed at or near (preferably within one foot) of the point where the sub-surface liquid line is coupled to the sub-surface vapor line, at or near the bottom of a well/borehole, the refrigerant charge variables, occasioned by varying line set distances and by varying well/borehole depths, are eliminated. This enables one to pre-order and install appropriately sized receivers, based upon known factors, thereby reducing system installation time and cost.

A further advantage of situating the pin restrictor at, or near, the point where the sub-surface liquid refrigerant transport line is coupled to the sub-surface vapor refrigerant transport line, instead of at some above-ground location, is that the time delay necessary for the above-surface receiver to one of fill and empty, depending on operation in the heating mode (fill) and the cooling mode (empty) is significantly reduced by the time it would otherwise take to transfer the liquid refrigerant to and from the liquid line length within the line set and the liquid line length within the well/borehole, which could often comprise 500 feet, or more, of tubing.

Further, when installing the pin restrictor at or near the bottom of a well/borehole, a refrigerant flow cut-off means, such as a ball cut-off valve or the like (ball cut-off valves and other refrigerant flow cut off valves are well understood by those skilled in the art), should be provided in the smaller interior diameter liquid/fluid refrigerant transport line, and in the larger interior diameter liquid/fluid refrigerant transport line, at respective points/locations above the surface of the ground and proximate to the well/borehole. This enables one to access the respective refrigerant transport lines located within a well/borehole, for purposes of pin restrictor insertion/removal, via reclaiming, and subsequently re-charging, only the refrigerant within the lines situated within the well/borehole, as opposed to having to reclaim and re-charge the entire system, thereby saving time and expense.

In such an arrangement where the pin restrictor is situated prior to the U bend near the bottom of the well/borehole, the smaller interior diameter liquid/fluid refrigerant transport line is insulated below the ground (so as to prevent any heat gain/loss "short-circuiting effect" with the thermally exposed larger interior diameter liquid/fluid refrigerant transport line) only to where the lower half of the casing/housing is located since, in the heating mode, the refrigerant is converted into mostly a vapor form as it exits the pin restrictor. The mostly vapor form refrigerant, exiting the pin restrictor in the heating mode, acquires naturally occurring geothermal heat by means of the relatively minor exposed sub-surface portion of the smaller interior diameter liquid/fluid refrigerant transport line 1, and by means of the significantly exposed larger interior diameter liquid/fluid refrigerant transport line, as is well understood by those skilled in the art.

As a design example, in a vertically oriented, three-ton system capacity, borehole, which is 375 feet deep, an insulated liquid/fluid refrigerant transport tube, such as a ⅜ O.D. copper refrigerant tube, is installed about 375 feet deep to a point at or near the bottom of the borehole. The bottom end of the liquid/fluid refrigerant transport tube is preferably bent in a U shape, so that the U shaped lower end of the liquid line extends approximately one foot above the base of the borehole, and is then operatively connected to at least one vapor/fluid refrigerant transport tube, such as a ¾ inch O.D. (O.D. means outside diameter) copper refrigerant tube, of about 374 feet deep for example. The preferable, but not mandatory, U bend in the liquid line acts as both a liquid and a compressor lubricating oil trap, thereby helping to prevent refrigerant migration into the liquid line, and helping to ensure an adequate return of compressor lubricating oil to the compressor. The liquid/fluid refrigerant transport line has a smaller interior diameter than the larger interior diameter vapor/fluid refrigerant transport line. The vapor/fluid refrigerant transport tube, or line, is in direct thermal contact with the sub-surface elements, which elements may consist of one or more of earth, rock, clay, sand, water, anti-freeze, water and anti-freeze, fluid, thermal grout (such as a thermal grout 85 mixture), or the like. The smaller interior diameter liquid/fluid refrigerant transport tube is insulated in most applications so as to avoid a "short-circuiting" effect of the geothermal heat gain/loss since the vapor and the liquid lines are typically in close proximity to one another in a deep well direct expansion, or analogous, heating/cooling application.

Further, as explained, testing has shown that, while single piston metering devices work well in the heating mode of a direct expansion application, as described herein, when installed at the connection point between a smaller interior diameter sub-surface liquid/fluid refrigerant line and a larger interior diameter sub-surface vapor/fluid refrigerant line, and particularly when such pin restrictor is installed near the bottom of a well/borehole in conjunction with only the bottom half of its casing housing, a single piston metering device can be too restrictive, and may not provide adequate refrigerant fluid flow rate capacity when a reverse-cycle direct expansion system is operating in the cooling mode. Consequently, the present invention includes means for providing an adequate piston metering device refrigerant fluid by-pass for use in the cooling mode operation.

One such refrigerant fluid by-pass means encompasses an extra smaller interior diameter liquid/fluid refrigerant transport line by-passing the single piston metering device in the cooling mode, installed at a point within about six inches to one foot above the single piston metering device, which extra by-pass line is automatically open in the cooling mode, but which extra by-pass line is automatically closed by a check valve, or the like, when the system is operating in the heating mode. While the extra by-pass line may be opened and closed by a remotely actuated solenoid valve, by a single piston valve (identical to a single piston metering device, but with no central orifice opening), or by a check valve, and the like, as is well understood by those skilled in the trade, a single piston valve or a check valve would generally be preferable for utilization in a direct expansion application because of their simple operation and general lack of need for control wiring and/or maintenance/servicing access.

Another alternative means for providing an adequate piston metering device refrigerant fluid by-pass for use in the cooling mode operation consists of utilizing an oversized single piston metering device, so as to permit sufficient design flow rate around the device in the cooling mode, and sealing part of the center orifice, so as to restrict the flow to the desired output in the heating mode. For example, for a 2 ton DWDX system, which would normally utilize a 058 size piston metering device, one could utilize a standard 3 ton single piston metering device, such as a size 067, which would permit an approximate 0.88 gallon per minute flow rate in the cooling mode, which would be entirely sufficient for the operational design of a 2 ton scroll compressor with a 0.59 gallon per minute refrigerant flow rate design, and then seal, with silver solder (15% silver solder) or the like, about 12% or more, depending on depths and refrigerant pressures, of the center orifice opening of the 3 ton device, so as to provide the lesser and optimal desired flow rate when the system is operating in the heating mode.

Yet another alternative, and presently preferred, means for providing an adequate piston metering device refrigerant fluid by-pass for use in the cooling mode operation consists of providing a refrigerant fluid by-pass means directly around the piston metering device/pin restrictor itself, which helps to ensure that any compressor oil that has accumulated in the bottom of the liquid line at the bottom of the well/borehole mixes with the circulating liquid refrigerant and is returned to the compressor.

In one such by-pass means, a secondary by-pass liquid refrigerant transport line would be installed adjacent to the pin restrictor and its seat within its lower half of casing housing. A check valve, or the like, within the by-pass line would ensure that the refrigerant only flowed around the pin restrictor and through the by-pass line when the system was operating in the cooling mode, as would be well understood by those skilled in the art. Such a by-pass line would preferably enter and exit the primary liquid refrigerant transport line at respective points just below, and just above the pin restrictor and its lower half of casing/housing, with the lower portion of the by-pass line still being located above the bottom U bend in the liquid line, so as to permit any oil within the U bend to easily escape.

In another such by-pass means, an approximate two to six inch portion of the liquid refrigerant transport line immediately above the top of the pin restrictor, when the pin restrictor is situated in its lower housing near the bottom of the well/borehole, would be perforated with holes drilled through the walls. The top of the pin restrictor means the side of the pin through which the refrigerant is entering while the system is operating in the heating mode. Such a perforated approximate two to six inch liquid line segment, for example, would then itself be contained within a larger interior diameter refrigerant tube, such as a ¾ inch refrigerant grade copper tube with a 0.03 inch wall thickness, for example. Thus, the pin restrictor would still be unable to turn sideways and become inoperative as it was one of dropped into its lower housing and forced out of the deep well/borehole altogether for servicing, for size adjustment, or for any other purpose. Further, in the cooling mode, as the liquid refrigerant pressure forced the pin restrictor out of its housing and into the perforated containment line segment, the liquid refrigerant would flow through the perforated sides of the containment line segment and around the pin restrictor, all without any flow rate restriction occasioned by the pin restrictor itself.

Pin restrictors typically have very small extensions protruding from the back ends of the fins along the pin's sides, which small extensions are designed to sit on the upper/back portion of the pin's housing when the system is operating in the cooling mode, so as to enable the refrigerant to simultaneously flow through and to by-pass the pin at a flow rate sufficient for system operation in the cooling mode, as is well understood by those skilled in the art. In a system design which incorporates pin accessibility where the pin's lower portion of housing is installed near the bottom of a well/borehole, as described above, the protruding back ends of the fins should preferably be removed, with the ends of its rear fins further being one of cut, shaved, ground, and angled at an angle greater than zero degrees and less than ninety degrees. The angle would preferably be forty-five degrees, plus or minus ten degrees, so as to help prevent potential snagging as the pin travels through the liquid line in the well/borehole upon insertion and extraction, and so as to help permit easier and faster pin extraction from the well/borehole.

The design and construction of pin restrictors and their casing/housing, such as one of an Aeroquip, a Chatliff, and a Byron pin restrictor and casing/housing, or the like, are well understood by those skilled in the art.

While at least one of a refrigerant fluid by-pass line and a preferred perforated pin containment tube/line segment, within a solid walled larger tube/line, will permit full cooling mode refrigerant flow, absent the need for the upper/back portion of the pin's housing, the perforated pin containment tube/line would typically be preferred as there would be no moving parts, as there would in a check valve.

Further, while at least one of a refrigerant fluid by-pass line and a preferred perforated pin containment tube/line segment, within a solid walled larger tube/line will eliminate the need for the upper/back portion of the pin's casing/housing for cooling mode refrigerant flow rate purposes, the upper/back portion of the pin's housing also contains and stops the pin from flowing through undesirable segments of the liquid refrigerant transport line in the cooling mode. Thus in the event at least one of a refrigerant fluid by-pass line and a preferred perforated pin containment tube/line segment, within a solid walled larger tube/line, is utilized in a well/borehole system application, at least one of the upper/back portion of the pin's casing/housing and a 90 degree refrigerant tube elbow/coupling should be provided at an accessible point within the liquid refrigerant transport line, at a location that is one of at and near the top of the well/borehole, as a blocking means to prevent the single piston/pin restrictor from traveling beyond the blocking point when the system is operating in the cooling mode. A 90 degree refrigerant tube elbow coupling, of the same tubing size of the liquid line, 3/8 outer diameter for example, provides too sharp of a turn for the pin to navigate in the cooling mode, and will thus prevent the pin from traveling too far to an undesirable location within the system, in the unlikely event the pin moved beyond one of the refrigerant by-pass line and the perforated pin containment tube/line.

Generally, the total combined area of the perforated holes within the sides of the containment line should not exceed the interior area of the containment line itself. Otherwise, it may become difficult to extract the pin restrictor from the bottom of the well/borehole by means of air/gas pressure, as the pressurized air/gas will also tend to by-pass the pin. For example, a 3/8 outside diameter refrigerant grade copper containment tube, with a 0.03 inch wall thickness, has an interior volume of 0.07793 inches, while a 1/8 inch diameter hole in the side of such a containment tube has a 0.012271875 inch interior diameter. Thus, no more than six of the 1/8 inch diameter holes should be drilled into the wall of the containment tube/line at a point below a 3/8 length of blank wall segment (the length of an Aeroquip pin restrictor), and no more than six of the 1/8 inch diameter holes should be drilled into the wall of the containment tube/line at a point above the 3/8 inch blank wall segment. Thus, should the pin restrictor be forced upwards to the 3/8 inch length of blank wall segment by means of the liquid refrigerant flow, it will stop at such point due to the effective interior size of the refrigerant flow path around the pin being approximately equivalent to an empty 3/8 outside diameter refrigerant grade copper refrigerant fluid transport tube/line.

Alternatively, a single piston metering device, within a piston metering device casing/housing, can be installed in the smaller interior diameter liquid line of a direct expansion system at any accessible above-ground, or very near-surface, location, rather than in the preferable close proximity to the actual evaporator connection. Such an accessible installation will permit servicing and piston size changes if desired, with only a modest potential system operational efficiency reduction, while still eliminating the "hunting" problem encountered with self-adjusting thermal expansion valves. Such an above-ground, or very near surface, accessible installation will not require the use of a U shaped liquid trap immediately prior to the installation of the single piston metering device, although for liquid and/or oil trap purposes, such a U shaped liquid trap may still be preferable.

Further, when significant seasonal changes in the geothermal temperatures, surrounding the sub-surface heat exchange tubing of a direct expansion heating/cooling system, are anticipated (which will typically only occur in near-surface geothermal heat exchange means applications, such as those utilizing a horizontal heat exchange field system, since sub-surface geothermal temperature conditions are extremely constant in a DWDX system application), at least two single piston metering devices of differing sizes, within their respective casing/housing, can be installed in above-ground and/or accessible near-surface locations, in conjunction with solenoid valves and temperature and/or pressure controlled switches designed to activate the desired piston metering device of the appropriate size for the applicable sub-surface temperature conditions, and designed to isolate and de-activate all other piston metering devices of differing sizes. The operation and construction of such temperature and/or pressure remotely activated valves, such as solenoid valves or the like, designed to activate and to isolate selected and respective single piston metering devices, are well understood by those skilled in the art, and, therefore, are not shown herein.

Regarding the design size of the metering device/pin restrictor for use in the heating mode, as mentioned, to achieve optimum system performance, the metering device, in any direct expansion heat pump system, and particularly in a DWDX system, should be sized to match the system's compressor design capacity (meaning the compressor's design capacity in tons, where one ton equals 12,000 BTUs), and not the system's heating design capacity, which system design capacity may differ.

The sub-surface refrigerant transport lines/tubing consisting of the insulated liquid line and the un-insulated vapor line, which are placed within a well/borehole, would be surrounded by a heat conductive fill material, such as a thermal grout or the like, which fill material would be in thermal contact with both the sub-surface un-insulated vapor refrigerant fluid transport line and the natural sub-surface geothermal surroundings.

Other customary direct expansion refrigerant system apparatus and materials would be utilized in a direct expansion system application, including a receiver, a thermal expansion valve for the interior air handler, an accumulator, and an air-handler, for example as described in U.S. Pat. No. 5,946,928 to Wiggs, which is incorporated herein by reference, all of which are well-known to those in the art and are therefore not shown herein.

The subject invention may be utilized as an individual unit, or by means of multiple units connected via headers/distributors, connecting sub-surface tubing in series or in parallel by means of common fluid supply and return refrigerant lines, to increase operational efficiencies and/or to reduce installation costs in a number of applications, as is well understood by those skilled in the art. The invention may be utilized to assist in efficiently heating or cooling air by means of a forced air heating/cooling system, or to assist in efficiently heating or cooling water in a hydronic heating/cooling system, as is also well understood by those skilled in the art.

BRIEF DESCRIPTION OF THE DRAWINGS

There are shown in the drawings embodiments of the invention as presently preferred. It should be understood, however, that since any number of smaller interior diameter liquid/fluid refrigerant transport lines could be utilized and respectively operatively connected, in a variety of arrangements, such as spiraled, or the like, to any number of larger interior diameter refrigerant transport lines, with each respective liquid/vapor refrigerant transport line connection incorporating a sub-surface metering device, since the geothermal heat exchange unit with a sub-surface metering device described can be connected and installed to other such units by means of refrigerant headers, or distributors, in one of series and in parallel, and since the metering device shown can be installed in an accessible above-ground, or near surface, location alone or in conjunction with alternatively sized metering devices, the operational selection of which are controlled by temperature and/or pressure sensors opening/closing solenoid valves, the invention is not limited to the simple exemplary arrangements and instrumentalities shown in the drawings, which demonstrate one single smaller interior diameter liquid/fluid refrigerant transport line operatively connected to one larger interior diameter, vapor/fluid refrigerant transport line, incorporating a single piston metering device and a perforated cooling mode liquid refrigerant pin restrictor by-pass means, wherein:

FIG. 6 shows a side view of a pin restrictor seated in the bottom half of its casing/housing near the U bend where the liquid line is coupled to the vapor in a deep well/borehole DX system application. A refrigerant fluid by-pass means around the pin restrictor, comprised of a perforated liquid refrigerant transport line segment within a larger refrigerant line, is provided so as to ensure adequate refrigerant flow is not impaired by the pin when the system is operating in the cooling mode. The top of the pin's casing/housing, as well as a ninety degree refrigerant tubing elbow, are shown at an accessible, above-ground, location so as to prevent the pin from potentially migrating into undesirable system areas during cooling mode operation. Also, refrigerant flow cut-off valves are shown in each of the respective liquid and vapor refrigerant lines, at an accessible point above the ground surface, so as to enable restrictor pin insertion/extraction via only reclaiming/recharging the refrigerant within the sub-surface refrigerant transport heat exchange tubing.

FIG. 7 shows a side view of a pin restrictor seated in the bottom half of its casing/housing near the U bend where the liquid line is coupled to the vapor in a deep well/borehole DX system application. A refrigerant fluid by-pass means around the pin restrictor, comprised of a by-pass refrigerant transport line is provided so as to ensure adequate refrigerant flow is not impaired by the pin when the system is operating in the cooling mode. The by-pass line is closed by means of a check valve, or the like, when the system is operating in the heating mode, and automatically opens when the system is operating in the cooling mode so that the refrigerant fluid flow is not impaired by the pin restrictor. Additionally, a means to force the pin out of the sub-surface tubing by means of pressurized gas is shown, with a net to catch the exiting pin.

DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
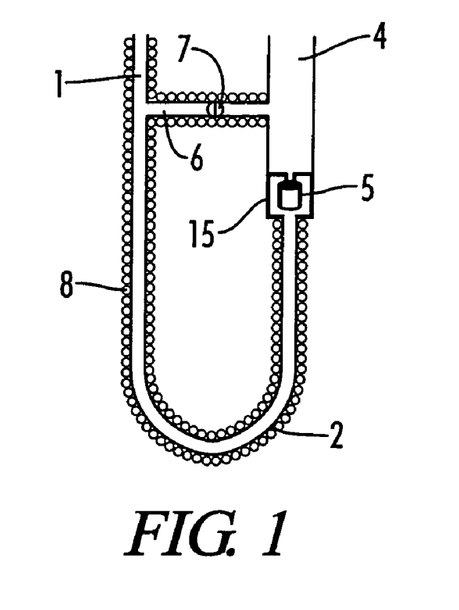
FIG. 1 is a side view of the lower U bend segment of a smaller interior diameter, insulated, liquid/fluid refrigerant transport line, where it connects with a larger interior diameter vapor/fluid refrigerant transport line, with a single piston metering device installed at the point where the liquid/fluid line connects with the vapor/fluid line, for use when the system is operating in the heating mode, together with a by-pass liquid refrigerant transport line and a check valve so as to enable additional refrigerant fluid flow around the single piston metering device when the system is operating in the cooling mode.

Referring now to the drawings in detail, where like numerals refer to like parts or elements, there is shown in FIG. 1 a side view of the lower segment of a smaller interior diameter liquid/fluid refrigerant transport line 1, showing a U bend 2 in the liquid line 2 to the point where the casing/housing 15 of a single piston metering device 5 connects the liquid/fluid line 1 with a larger interior diameter vapor/fluid refrigerant transport line 4, for use when a direct expansion heating/cooling system (not shown) is operating in the heating mode, together with a by-pass line 6 and a check valve 7 so as to enable additional refrigerant fluid flow around the single piston metering device 5 only when the system is operating in the cooling mode. The smaller interior diameter liquid/fluid refrigerant line 1 is shown as being insulated 8.

The check valve 7, which is shown in a closed position for operation in the heating mode, is well understood by those skilled in the art. The check valve 7 will automatically open when the system is operating in the cooling mode, and will automatically close, by means of the refrigerant fluid flow direction, when the system is operating in the heating mode, as is well understood by those skilled in the art. Also as well understood by those skilled in the art, the function of the check valve 7 could be accomplished by any other suitable flow restriction device, such as a remotely actuated valve, a single piston valve, or the like (not shown), although use of a check valve 7 would generally be preferable since the flow restriction device utilized would be difficult to access in a deep well direct expansion application, and since no valve signal/power control lines and generally no maintenance would be required for a check valve 7.

Figure 2:
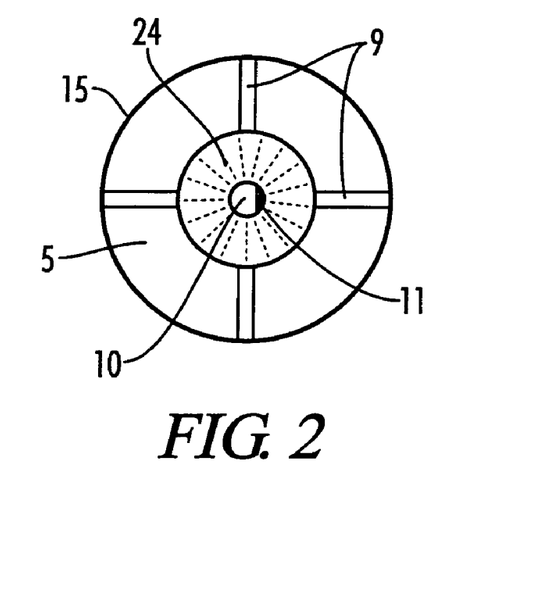
FIG. 2 is a front view of an oversized single piston metering device, with fins, where a portion of the center orifice opening has been sealed shut.

FIG. 2 shows a front view of an oversized single piston metering device 5, including a piston 24 with fins 9, where the center orifice opening 10 in the piston 24 has been partially sealed shut with silver solder 11, all within a casing/housing 15.

Figure 3:
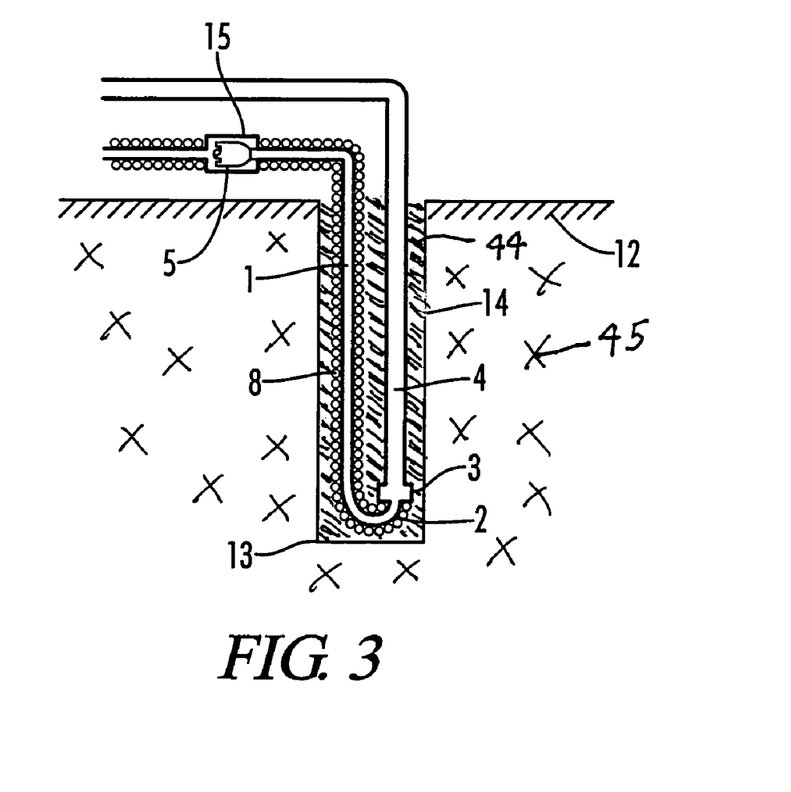
FIG. 3 is a side view of a smaller interior diameter liquid/fluid refrigerant transport line run parallel to, and above, the ground, with a single piston metering device installed above the ground, with the liquid line being insulated and extending to the bottom of a deep well, where the liquid line forms a U bend at the bottom of the deep well and is connected to a larger interior diameter vapor/fluid refrigerant transport line by means of a coupling device.

FIG. 3 shows a side view of a smaller interior diameter liquid/fluid refrigerant transport line 1 run parallel to, and above, the ground 12, with a single piston metering device 5, within a piston metering device casing 15, all installed above the ground 12, with the liquid line 1 being insulated 8 and extending to the bottom 13 of a deep well/borehole 14, where the liquid line 1 forms a U bend 2 near the bottom 13 of the deep well/borehole 14 and is connected to a larger interior diameter vapor/fluid refrigerant transport line 4 by means of a refrigerant line coupling device 3. Heat conductive fill material 44 fills the empty space within the well/borehole 14 and is in thermal contact with both the sub-surface vapor refrigerant fluid transport line 4 and the natural sub-surface geothermal surroundings 45.

Figure 4:
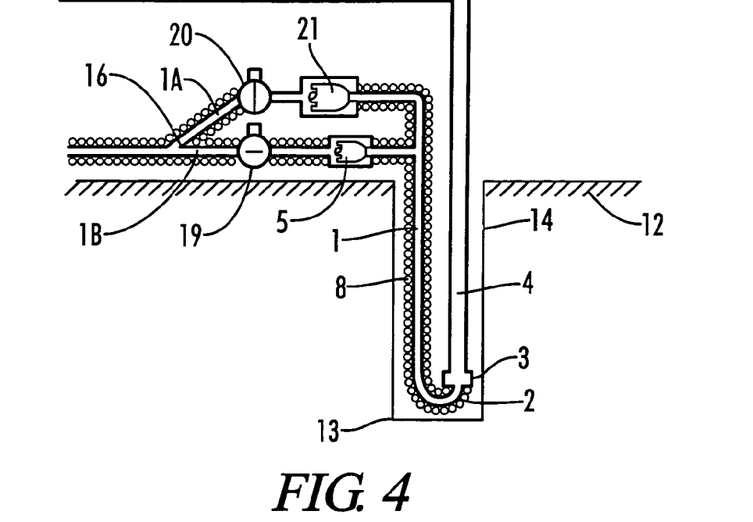
FIG. 4 shows a side view of how multiple, and different sized, refrigerant flow regulating metering devices, 5 and 21, are disposed in an above-surface and an accessible portion of the liquid refrigerant transport line.

FIG. 4 shows a side view of how multiple, and different sized, refrigerant flow regulating metering devices, 5 and 21, are disposed in an above-surface and an accessible portion of the liquid refrigerant transport line 1. Specifically, a smaller interior diameter liquid/fluid refrigerant transport line 1 extends parallel to, and above, the ground 12 to a point where it splits, by means of a common liquid refrigerant fluid transport line header/distributor 16, into two, multiple, respective liquid lines 1A and 1B, both of which are above ground 12 and accessible for servicing. The refrigerant flow in the upper liquid line 1A is shown as being controlled by a remotely actuated valve in a closed position 20, such as a closed solenoid valve or the like. When the closed valve 20 is activated in a closed position, no refrigerant fluid (not shown) can travel through a secondary, and larger, single piston metering device 21 into the deep well 14 with a greater refrigerant fluid flow rate.

The refrigerant flow in the lower liquid line 1B is shown as being controlled by a remotely actuated valve in an open position 19, such as an open solenoid valve or the like. When the open valve 19 is activated in an open position, refrigerant fluid can travel, at a lesser refrigerant fluid flow rate, through a primary, and smaller, single piston metering device 5 into the deep well 14, by means of the primary liquid line 1. The liquid lines are all insulated 8 with rubatex or the like. The liquid line 1 is attached, by means of a refrigerant line coupling device 3, to an un-insulated larger interior diameter vapor/fluid refrigerant transport line 4, where geothermal heat transfer takes place within the deep well 14. The liquid line 1 is shown as being coupled 3 to the vapor line 4 at the bottom 13 of a deep well/borehole 14. The respective remotely actuated valves, 19 and 20, are valves such as solenoid valves, and are activated to either open or close by means of at least one of pre-determined refrigerant fluid temperatures and pressures, so as to provide reasonable heating efficiencies during significantly changing system load and/or sub-surface geothermal temperature conditions. The connection, operation, power supply hook-ups, and settings of remotely actuated valves, such as solenoid valves, are well understood by those skilled in the art, and, therefore, are not shown herein. Further, while only two multiple metering devices, 5 and 21, are shown herein, the same, but extended to three or more, installation procedure would be utilized if one elected to utilize three, or more, multiple sized metering devices so as to automatically fine-tune the direct expansion system's heating mode operation efficiencies to a higher degree under less significant changes in conditions.

Figure 5:
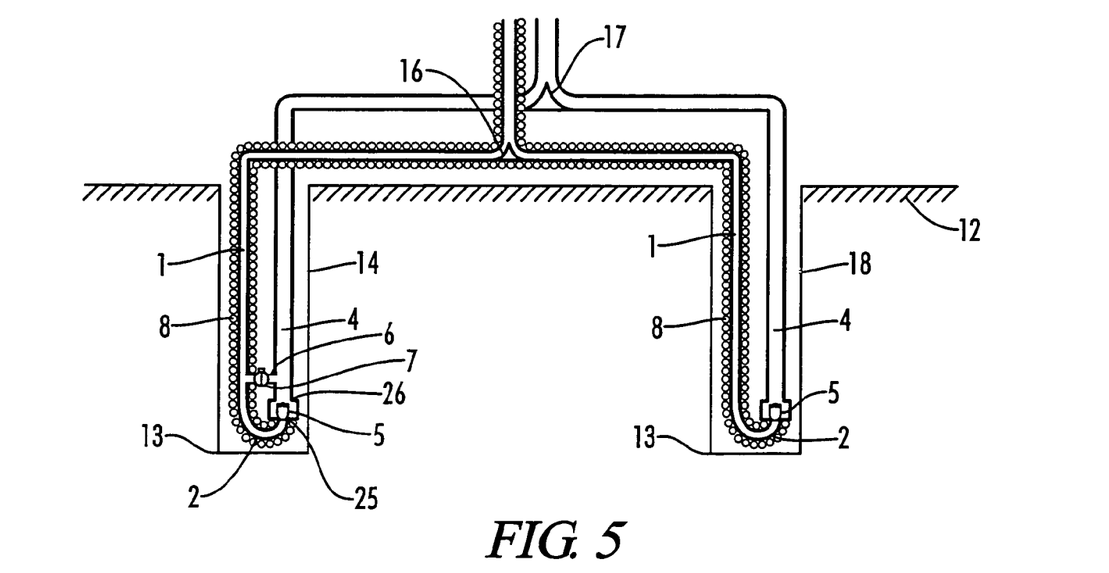
FIG. 5 shows a side view of a plurality of sub-surface heat exchange means, with a common liquid refrigerant fluid transport line header/distributor, and with a common vapor refrigerant fluid transport line header/distributor.

FIG. 5 shows a side view of a plurality of sub-surface heat exchange means. More specifically, a smaller interior diameter liquid/fluid refrigerant transport line 1 is divided into two segments by a common liquid refrigerant fluid transport line header/distributor 16 at an above ground 12, accessible location. Each respectively divided liquid line 1 is then shown as being inserted into the bottom 13 of a deep well/borehole 14. The liquid lines 1 are all insulated. Each respective liquid line 1 forms a U bend 2 at the bottom 13 of the deep well/borehole 14 and is then coupled, by means of a respective refrigerant line coupling device 3, as shown in FIG. 4, which is incorporated herein by reference, to a larger interior diameter vapor/fluid refrigerant transport line 4. Each respective vapor line 4, which is not insulated for geothermal heat transfer purposes, extends up through the respective deep well/borehole, 14 and 18 (on the right), to an above ground 12 and accessible location, where each respective vapor line is joined by means of a common vapor refrigerant fluid transport line header/distributor 17, and then travels to the remainder of the direct expansion system, such as the compressor, interior air handler, and the like, as is well understood by those skilled in the art, and, therefore, is not shown herein.

For further purposes of illustration, the subsurface heat exchange means on the left is shown with a single piston metering device 5 attaching the lower sub-surface end portion 25 of the liquid refrigerant transport line 1, just above a U bend 2 in the liquid line 1, to the lower sub-surface distal end portion of the vapor refrigerant transport line 26, with a refrigerant fluid by-pass line 6 shown just above the single piston metering device 5, and with a closed check valve 7 located in the by-pass line 6, so as to restrict refrigerant fluid flow through the by-pass line 6 when the direct expansion heating/cooling system (not shown) is operating in the heating mode, but so as to permit refrigerant fluid flow when the refrigerant fluid is traveling in the reverse direction when the system is operating in the cooling mode.

Again, for further purposes of illustration, the subsurface heat exchange means on the right is shown with a single piston metering device 5 attaching the lower sub-surface end portion 25 of the liquid refrigerant transport line 1, just above a U bend 2 in the liquid line 1, to the lower sub-surface distal end portion of the vapor refrigerant transport line 26, with the metering device 5 being an oversized metering device 5, with a partially silver solder 11, or the like, filled center orifice 10 as shown and described in FIG. 2, which is incorporated herein by reference.

As can be seen, any appropriate metering device 5, can be utilized for heating mode operation, so long as an adequate refrigerant fluid flow is insured in the cooling mode when the direct expansion heating/cooling system's refrigerant fluid flow through the respective sub-surface heat exchange vapor refrigerant transport lines 4 is traveling in the reverse direction from that of the system's heating mode operation. Further, while only two sub-surface heat exchange means are shown herein, the same, but extended to three or more, installation procedure would be utilized if one elected to utilize three, or more, sub-surface heat exchange means so as to shorten the otherwise requisite depth of only one deep well/borehole.

Figure 6:
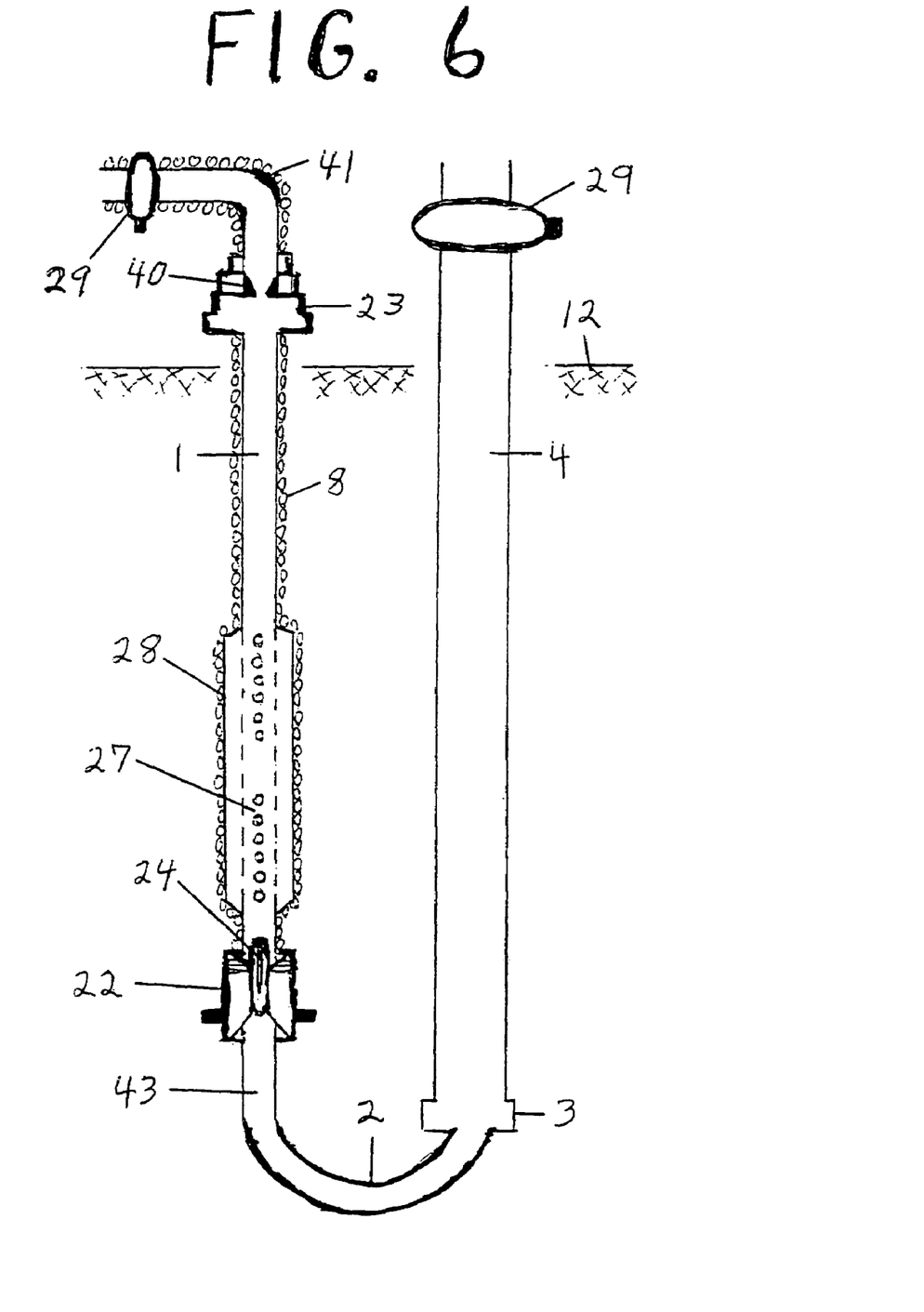

FIG. 6 shows a side view of a smaller interior diameter liquid/fluid refrigerant transport line 1, connected to a larger interior diameter liquid/fluid refrigerant transport line 4 by means of a refrigerant line coupling device 3, as would all be positioned within a deep/well borehole (not shown in this drawing, but similar to 14 in FIG. 3 hereinabove, which is incorporated herein by reference).

Here, the entire single piston metering device (not shown herein as one complete unit, as identified by number 5 in FIG. 1 hereinabove, which is incorporated herein by reference), which incorporates the device's casing/housing, is shown with its casing/housing broken into two parts, namely, into a lower casing/housing half 22 and an upper casing/housing half 23, so as to permit optional access to the piston/pin/pin restrictor 24 itself. The upper half of the casing/housing 23 is located above the ground 12 surface so that the upper half of the casing/housing 23 is at an accessible location and will act as a safety catch/blocking means to prevent the pin 24 from potentially migrating into unwanted areas of the system when the refrigerant fluid's (not shown herein) directional flow is reversed and is operating in the cooling mode. The safety catch/blocking means in the upper half of the casing/housing 23 is comprised of an upper back portion ledge 40, which restricts the passage of the pin 24. An additional single piston/pin restrictor 24 safety catch/blocking means is shown, which can be one of additionally and alternately utilized, comprised of a ninety degree refrigerant tubing elbow 41. The ninety degree elbow 41, which is typically a standard factory-made elbow/coupling 41, has a sufficiently restrictive curve radius so as to prevent the pin 42 from moving through the elbow 41.

The lower half of the casing/housing 22, with the piston/pin/pin restrictor 24 seated in the lower half of the casing/housing 22 in its heating mode operational position, is shown as being located in the smaller interior diameter liquid/fluid refrigerant transport line 1 just before the U bend 2 at the bottom (not shown herein, but the same as 13 in FIG. 3 hereinabove) of a deep well/borehole, and within one foot (distances not drawn to scale) of the refrigerant line coupling device 3 near the bottom of the well/borehole. In such an arrangement, the smaller interior diameter liquid/fluid refrigerant transport line 1 is insulated 8, and is insulated 8 below the ground 12 (so as to prevent any heat gain/loss short-circuiting effect with the thermally exposed larger interior diameter liquid/fluid refrigerant transport line 4) only to the lower half of the casing/housing 22 since, in the heating mode, the refrigerant is converted into mostly a vapor form as it exits the pin restrictor 24. The mostly vapor form refrigerant (not shown herein), exiting the pin restrictor 24 in the heating mode, acquires naturally occurring geothermal heat by means of the relatively minor exposed sub-surface portion 43 of the smaller interior diameter liquid/fluid refrigerant transport line 1, and by means of the significantly exposed larger interior diameter liquid/fluid refrigerant transport line 4, as is well understood by those skilled in the art.

Such a lower half of the casing/housing 22 location, as mentioned, is advantageous because it enables one to accurately determine the size of a DX system's receiver (not shown herein) based upon the interior air handler's (not shown herein) refrigerant content differential between one of heating mode, cooling mode, and dehumidification mode system operation, regardless of the depth of the well/borehole, and regardless of the length of the refrigerant line sets (not shown herein) leading from the interior system equipment (not shown herein) to the deep well/borehole.

In such an alternate accessible means, such a pin restrictor 24 must be installed within such a smaller interior diameter liquid/fluid refrigerant transport line 1 that has an interior diameter greater than the side (horizontal) diameter of the pin restrictor 24 and that has an interior diameter smaller than the lengthwise (vertical) diameter of the pin restrictor 24. For example, a pin restrictor (such as, for example, an Aeroquip pin restrictor) that has a side diameter, including its protruding fins, of about ¼ inch and a length of about ⅜ inch, would easily slide up and down through a ⅜ outside diameter, refrigerant grade copper, refrigerant transport line/tube, which line/tube has a 0.03 inch thick wall thickness, but the pin restrictor 24 could not turn sideways within the line/tube so as to foul the system's operation.

Additionally shown is one pin restrictor 24 refrigerant fluid by-pass means, consisting of a perforated inner smaller diameter liquid/fluid refrigerant transport line 27 (which is the same size as the smaller diameter liquid/fluid refrigerant transport line so as to permit the pin restrictor 24 to move up and down within the well/borehole whenever one of initial placement and subsequent service and replacement is desired), within a larger, solid walled, containment refrigerant tube/line 28, which, together, permit liquid refrigerant to easily flow around the pin restrictor 24 when the system is operating in the cooling mode without causing the pin 24 itself to unduly impede the optimum requisite flow of liquid refrigerant. As is well understood by those skilled in the art, the refrigerant flow in the heating mode is primarily in a downward direction through the smaller diameter liquid/fluid refrigerant transport line 1, and is primarily in a reverse, upwards, direction in the cooling mode.

In a cooling system operational mode, the pin restrictor 24 will be forced up and out of its seating in the lower half of its casing/housing 22, by means of the force of the liquid refrigerant, and will travel up to a point within the perforated inner smaller diameter liquid/fluid refrigerant transport line 27 where the upwards force of the liquid refrigerant is neutralized by the gravitational weight of the pin 24. The pin 24 will simply remain at such a stopped position, with the refrigerant fluid easily by-passing the pin 24 without flow impediment, until the system either shuts down or switches to a heating mode of operation, at which point the pin 24 will simply fall back into its position within of the seating in the lower half of its casing/housing 22.

Also, a refrigerant flow cut-off means 29, such as a ball cut-off valve or the like, is also shown in the smaller interior diameter liquid/fluid refrigerant transport line 1, and in the larger interior diameter liquid/fluid refrigerant transport line 4, at respective locations above the surface of the ground 12 which are proximate/near to the well/borehole. This enables one to access the respective lines, 1 and 4, located within a well/borehole, for purposes of pin restrictor 24 insertion/removal via reclaiming, and subsequently re-charging, only the refrigerant within the lines, 1 and 4, situated within the well/borehole, as opposed to having to reclaim and re-charge the entire system, thereby saving time and expense.

The subject preferred pin restrictor 24 location within the sub-surface smaller diameter liquid/fluid refrigerant transport line 1, shown here as seated within the lower half of its casing/housing 22 in the heating mode near the U-bend 2 at the bottom of a well/borehole, would be the same if utilized in multiple subsurface refrigerant transport heat exchange line sets, 1 and 4, as shown in FIG. 5 hereinabove (except for the differing single piston metering device locations shown in FIG. 5), which is incorporated herein by reference. The sub-surface refrigerant transport lines/tubing, 1 and 4, are placed within a well/borehole where heat conductive fill material (not shown herein, but the same as 44 in FIG. 3, which is incorporated herein by reference) is in thermal contact with both the sub-surface vapor refrigerant fluid transport line 4 and the natural sub-surface geothermal surroundings.

The pin restrictor 24 would preferably be sized to match the system's compressor's (not shown herein) design size in tonnage capacity, rather than to match the overall heating/cooling system's design tonnage capacity. Such a system's compressor and its design capacity in tons are well understood by those skilled in the art.

Figure 7:
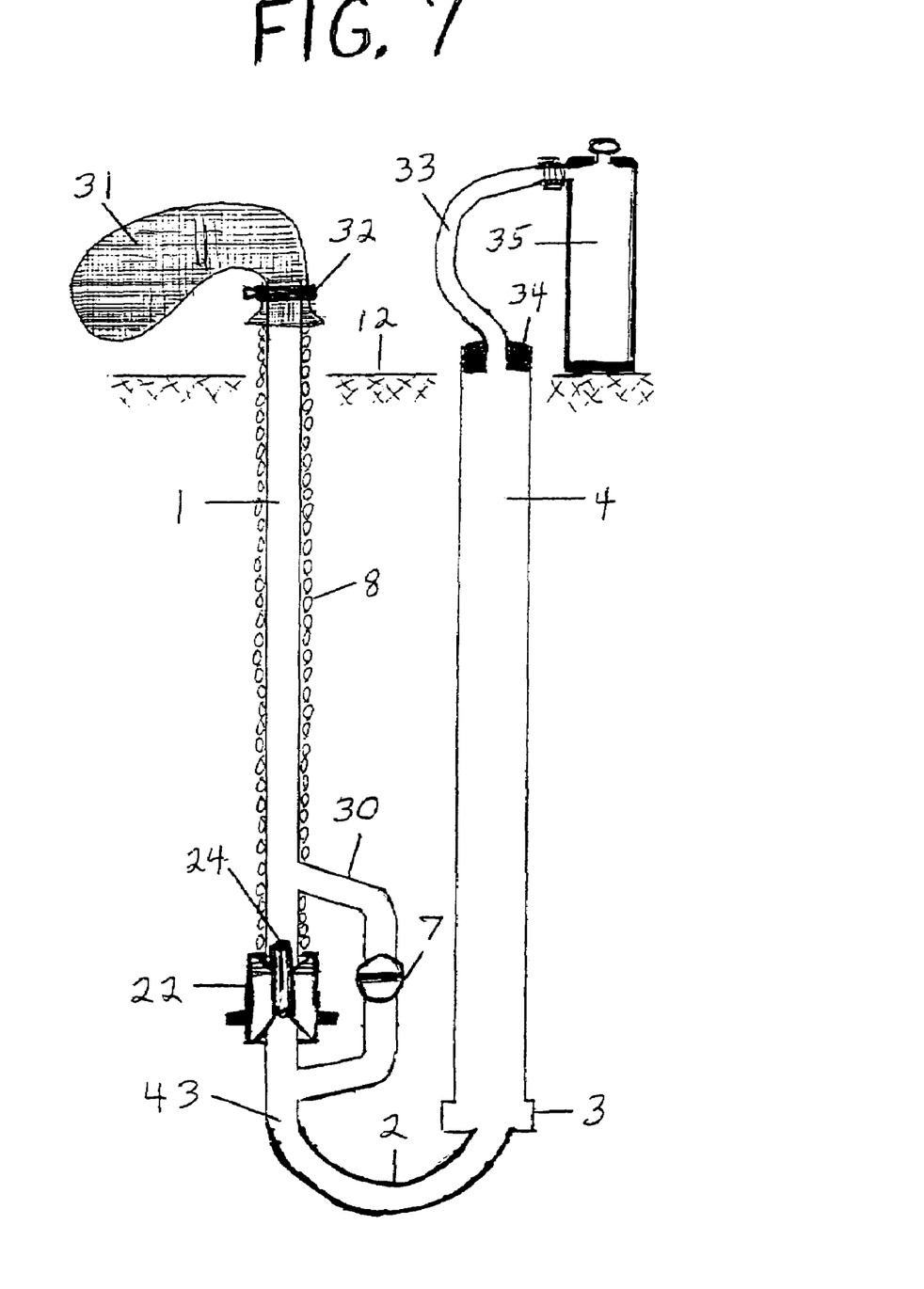

FIG. 7 shows a side view of a smaller interior diameter liquid/fluid refrigerant transport line 1, connected to a larger interior diameter liquid/fluid refrigerant transport line 4 by means of a refrigerant line coupling device 3, as would all be positioned within a deep/well borehole (not shown in this drawing, but similar to 14 in FIG. 3 hereinabove, which is incorporated herein by reference).

Here, the lower half of the pin restrictor's 24 casing/housing 22 is shown with the piston/pin/pin restrictor 24 seated in the lower half of the casing/housing 22 in its heating mode operational position, and is shown as being located in the smaller interior diameter liquid/fluid refrigerant transport line 1 just before the U bend 2 at the bottom (not shown herein, but the same as 13 in FIG. 3 hereinabove) of a deep well/borehole, and within one foot (distances not drawn to scale) of the refrigerant line coupling device 3 near the bottom of the well/borehole. In such an arrangement, the smaller interior diameter liquid/fluid refrigerant transport line 1 is insulated 8, and is insulated 8 below the ground 12 (so as to prevent any heat gain/loss short-circuiting effect with the thermally exposed larger interior diameter liquid/fluid refrigerant transport line 4) only to the lower half of the casing/housing 22 since, in the heating mode, the refrigerant is converted into mostly a vapor form as it exits the pin restrictor 24. The mostly vapor form refrigerant (not shown herein), exiting the pin restrictor 24 in the heating mode, acquires naturally occurring geothermal heat by means of the relatively minor exposed sub-surface portion 43 of the smaller interior diameter liquid/fluid refrigerant transport line 1, and by means of the significantly exposed larger interior diameter liquid/fluid refrigerant transport line 4, as is well understood by those skilled in the art.

Additionally shown is one pin restrictor 24 refrigerant by-pass means, consisting of a by-pass line portion 30 of a smaller diameter liquid/fluid refrigerant transport line 1, which by-pass line portion 30 is of sufficient interior diameter so as to permit uninhibited refrigerant fluid flow around the pin 24 when the system is operating in the cooling mode. As is well understood by those skilled in the art, the refrigerant flow in the heating mode is primarily in a downward direction in the well/borehole through the smaller diameter liquid/fluid refrigerant transport line 1 and is primarily in a reverse, upwards, direction in the cooling mode.

A check valve 7, shown here in the closed position, is situated within the pin restrictor's 24 by-pass line portion 30 so as to prevent refrigerant fluid flow through the by-pass line 30 when the system is operating in the heating mode. However, the check valve 7 will automatically open when the refrigerant fluid' directional flow within the sub-surface heat exchange tubing is reversed in the cooling mode, as is well understood by those skilled in the art. While a check valve 7 is shown herein, the valve could alternatively be one of a remotely actuated valve, a single piston valve, and the like the design and operation of all of which valves are well understood by those skilled in the art.

Additionally shown is a restrictor pin 24 recovery means, comprised of a catch net 31, secured to the above-ground 12 portion of the smaller diameter liquid/fluid refrigerant transport line 1 by means of a cable clamp 32 (although a securely fastened wire tie, or the like, will work just as well,), and further comprised of a pressurized gas hose 33 connected to the above-ground 12 portion of the larger diameter liquid/fluid refrigerant transport line 4 by means of a plug 34, or the like. The pressurized gas hose 33 is shown here as extending from a pressurized gas container 35, such as a dry nitrogen gas cylinder, or the like. Any pressurized fluid may be utilized to force the pin 24 out, however, dry nitrogen is preferred because it will not introduce moisture into the refrigerant lines. Once connected, when about 75 psi is released from the gas container 35, the gas will blow the pin 24 out of the refrigerant line 1 and into the catch net 31. The pin 24 may then be one of cleaned and changed to a different size as desired. Once servicing is complete, the pin 24 is simply dropped back into the hole, nose first, the refrigerant lines 1 and 4 are reconnected to the line set (not shown herein), a vacuum is pulled, and the system would be then be recharged with refrigerant, as would be well understood by those is skilled in the art.

Figure 8:
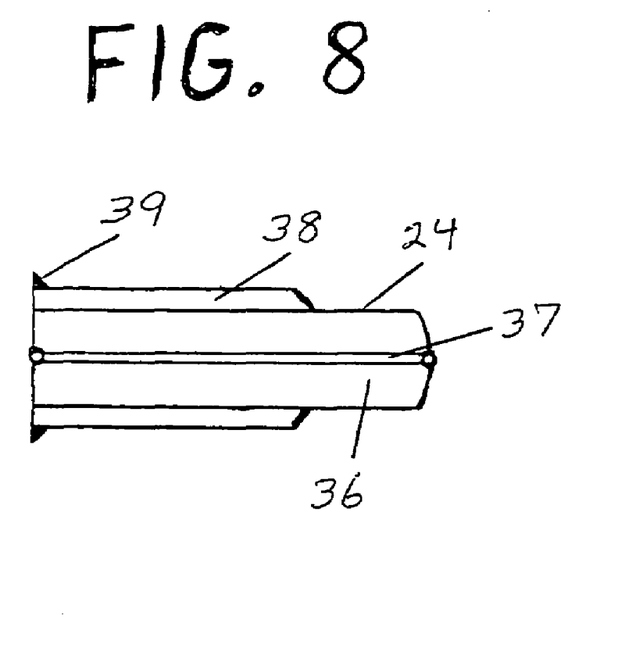
FIG. 8 shows a side view of an Aeroquip type of piston/pin/pin restrictor with its solid body, its central orifice/hole, which meters the refrigerant flow in the heating mode at a pre-determined and specified rate, and its spacer fins. The back ends of the fins have small extensions protruding from the back ends of the fins along the pin's sides.

FIG. 8 shows a side view of an Aeroquip type of piston/pin/pin restrictor 24, with its solid body 36, its central orifice/hole 37, which meters the refrigerant flow in the heating mode at a pre-determined and specified rate, and its spacer fins 38. The back ends of the fins 38 have very small extensions 39 protruding from the back ends of the fins 38 along the pin's 24 sides, which small extensions 39 are designed to sit on the upper/back portion ledge 40 of the pin's upper half of the casing/housing 23 (items 40 and 23 are not shown in this drawing, but are the same as item numbers 40 and 23 in FIG. 6, which is incorporated herein by reference) when the system is operating in the cooling mode so as to allow sufficient refrigerant fluid to by-pass the pin restrictor 24. The construction and design of an Aeroquip pin restrictor is well understood by those skilled in the art.

Figure 9:
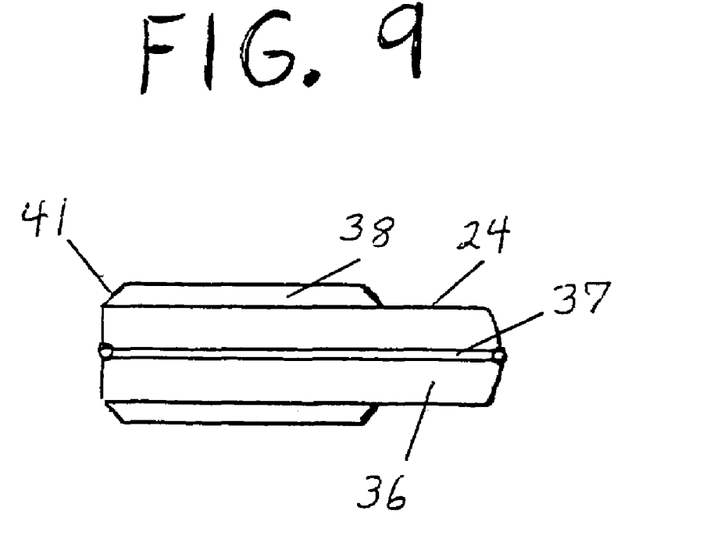
FIG. 9 shows a side view of an Aeroquip type of piston/pin/pin restrictor, with its solid body, its central orifice/hole, which meters the refrigerant flow in the heating mode at a pre-determined and specified rate, and its spacer fins. The back ends of the fins, which normally have small extensions protruding from the back ends of the fins along the pin's sides, have been removed and the ends of its rear fins angled at an angle.

FIG. 9 shows a side view of an Aeroquip type of piston/pin/pin restrictor 24, with its solid body 36, its central orifice/hole 37, which meters the refrigerant flow in the heating mode at a pre-determined and specified rate, and its spacer fins 38. The back ends of the fins 38, which normally have very small extensions 39 (not shown herein but the same as item 39 in FIG. 8, which is incorporated herein by reference) protruding from the back ends of the fins 38 along the pin's 24 sides, have been cut, ground, shaved, or the like, down to and has the ends of its rear fins 38 one of cut, shaved, ground, and angled at an angle 41 greater than zero degrees and less than ninety degrees. The angle 41 is preferably forty-five degrees, plus or minus ten degrees, so as to assist in eliminating potential resistance or snagging during pin 24 extraction from the liquid line 1 within the well (not shown herein).

What is claimed is:

1. A direct expansion heat pump system geothermal heat exchange arrangement comprising:
   at least one smaller interior diameter liquid refrigerant fluid transport line having at least a lower segment of the liquid refrigerant fluid transport line positioned in a subsurface location;
   at least one larger interior diameter vapor refrigerant fluid transport line having a lower distal end disposed proximate to the lower end segment of the at least one liquid fluid transport line in the sub-surface location, with at least a lower segment of the at least one vapor refrigerant fluid transport line in thermal contact with sub-surface material in the subsurface location; and
   at least one refrigerant flow regulator disposed in at least one of a sub-surface location of the liquid refrigerant fluid transport line.

2. The geothermal heat exchange arrangement of claim 1 wherein the at least one refrigerant flow regulator is a metering device.

3. The geothermal heat exchange arrangement of claim 2 wherein the at least one metering device is a single piston metering device with a single piston/pin restrictor.

4. The geothermal heat exchange arrangement of claim 3 wherein the at least one single piston/pin restrictor has a blocking means at an accessible location, which location is one of at the surface and near the surface, and which location is above the liquid refrigerant fluid transport line's subsurface location, which blocking means prevents the metering device's single piston/pin restrictor from traveling beyond the blocking means whenever it exits the lower half of its housing/casing in a cooling operational mode.

5. The geothermal heat exchange arrangement of claim 4 wherein the at least one single piston/pin restrictor blocking means is comprised of at least one of
   the upper/top half encasement/housing of a single piston metering device, which upper/top half encasement/housing is situated within the smaller interior diameter liquid refrigerant fluid transport line at an accessible location, which location is one of at the surface and near the surface, and which location is above the liquid refrigerant fluid transport line's subsurface location, and
   a 90 degree elbow bend, which 90 degree elbow bend is situated within the smaller interior diameter liquid refrigerant fluid transport line at an accessible location, which location is one of at the surface and near the surface, and which location is above the liquid refrigerant fluid transport line's subsurface location.

6. The geothermal heat exchange arrangement of claim 2 wherein the at least one metering device is a single piston metering device, with only its lower half encasement/housing and its pin restrictor/single piston situated within the subsurface location, and wherein the pin restrictor/single piston is accessible.

7. The geothermal heat exchange arrangement of claim 6 wherein the smaller interior diameter liquid refrigerant fluid transport line has an interior diameter greater than the side/horizontal diameter of the pin restrictor/single piston, and where the smaller interior diameter liquid refrigerant fluid transport line has an interior diameter smaller than the lengthwise/vertical length of the pin restrictor/single piston.

8. The geothermal heat exchange arrangement of claim 6 wherein the at least one pin restrictor/single piston is accessed within its sub-surface location by means of fluid pressure exerted through the vapor refrigerant fluid transport line, which pressure thereby forces the pin restrictor/single piston out of the liquid refrigerant fluid transport line, which liquid line is opened at an accessible point.

9. The geothermal heat exchange arrangement of claim 8 wherein the at least one pin restrictor/single piston forced out of the at least one opened liquid refrigerant fluid transport line is trapped/caught in at least one trap means.

10. The geothermal heat exchange arrangement of claim 9 wherein the at least one trap means is a net.

11. The geothermal heat exchange arrangement of claim 8 wherein the at least one pin restrictor/single piston forced out of the at least one opened liquid refrigerant fluid transport line has the ends of its rear fins at least one of cut, shaved, ground, and angled to an angle greater than 0 degrees and less than 90 degrees.

12. The geothermal heat exchange arrangement of claim 11 wherein the angle is 45 degrees, plus or minus 10 degrees.

13. The geothermal heat exchange arrangement of claim 6 further comprising a by-pass means, for the refrigerant fluid to travel around the at least one pin restrictor/single piston in the cooling mode of system operation, comprised of a perforated liquid refrigerant transport tube segment, enclosed within a larger and solid-walled interior diameter liquid refrigerant transport tube segment, which composite tube segments are disposed in the portion of the liquid refrigerant transport tube/line above the pin restrictor when the pin restrictor is seated within the lower half of its casing/housing in the sub-surface liquid fluid transport line.

14. The geothermal heat exchange arrangement of claim 6 further comprising:
   a by-pass refrigerant fluid transport line disposed in a sub-surface location and operatively coupling the segment of the liquid refrigerant fluid transport line before the at least one refrigerant flow regulator to the segment of the liquid refrigerant fluid transport line after the at least one refrigerant flow regulator; and
   a flow restriction device disposed in the by-pass refrigerant fluid transport line so as to permit refrigerant fluid flow from the cooling mode operation of the direct expansion heat pump system through the by-pass line, but blocking refrigerant flow through the by-pass line in the reverse direction in the heating mode operation.

15. The geothermal heat exchange arrangement of claim 14 wherein the flow restriction device is a check valve.

16. The geothermal heat exchange arrangement of claim 14 wherein the flow restriction device is a remotely actuated valve.

17. The geothermal heat exchange arrangement of claim 14, wherein the flow restriction device is a single piston valve.

18. The geothermal heat exchange arrangement of claim 14 wherein the by-pass refrigerant fluid transport line is integral to the refrigerant flow regulator.

19. The geothermal heat exchange arrangement of claim 1 wherein multiple liquid refrigerant transport lines are operatively respectively connected to multiple vapor refrigerant transport lines, and where respective multiple refrigerant flow regulating metering devices are respectively disposed in a sub-surface portion of the respective multiple liquid refrigerant transport lines, with each respective refrigerant flow regulating metering device being one of activated in the system's heating mode of operation and deactivated in the system's cooling mode of operation.

20. The geothermal heat exchange arrangement of claim 19 wherein the refrigerant flow regulators are metering devices.

21. The geothermal heat exchange arrangement of claim 20 wherein the metering devices are single piston metering devices/pin restrictors.

22. The geothermal heat exchange arrangement of claim 21 wherein the metering devices are single piston metering devices, with only their respective lower half encasement/housing and pin restrictors/single pistons situated within the subsurface locations in the respective liquid refrigerant transport lines, and wherein the pin restrictors/single pistons are accessible by means of the exertion of force from a pressurized fluid inserted into the respective vapor refrigerant transport lines.

23. The geothermal heat exchange arrangement of claim 22 further comprising a by-pass means, for the refrigerant fluid to travel around the respective pin restrictors/single pistons in the cooling mode of system operation, comprised of respective multiple perforated liquid refrigerant transport tube segments, enclosed within respective larger and solid-walled interior diameter liquid refrigerant transport tube segments, which respective composite tube segments are respectively disposed in the portions of the respective liquid refrigerant transport tubes/lines above the respective pin restrictors when the pin restrictors are seated within the lower half of their casing/housing.

24. The geothermal heat exchange arrangement of claim 22 further comprising:
respective multiple refrigerant fluid transport by-pass lines disposed in respective sub-surface locations and operatively coupling the respective segments of the respective liquid refrigerant fluid transport lines before the respective refrigerant flow regulators to the respective segments of the respective liquid refrigerant fluid transport lines after the respective refrigerant flow regulators; and
multiple respective flow restriction devices disposed in the respective by-pass refrigerant fluid transport lines so as to permit refrigerant fluid flow from the cooling mode operation of the direct expansion heat pump system through the respective by-pass lines, but blocking refrigerant flow through the respective by-pass lines in the reverse direction in the heating mode operation.

25. The geothermal heat exchange arrangement of claim 24 wherein the respective flow restriction devices are check valves.

26. The geothermal heat exchange arrangement of claim 24 wherein the respective flow restriction devices are remotely actuated valves.

27. The geothermal heat exchange arrangement of claim 24 wherein the respective flow restriction devices are single piston valves.

28. The geothermal heat exchange arrangement of claim 24 wherein the respective by-pass refrigerant fluid transport lines are integral to the respective refrigerant flow regulators.

29. The geothermal heat exchange arrangement of claim 1 wherein the at least one liquid refrigerant fluid transport line is insulated only to the location of the at least one metering device within the at least one liquid refrigerant fluid transport line.

30. The geothermal heat exchange arrangement of claim 1 wherein the sub-surface refrigerant transfer tubing is placed within at least one well/borehole where heat conductive fill material is in thermal contact with both the at least one sub-surface vapor refrigerant fluid transport line and the natural sub-surface geothermal surroundings.

31. The geothermal heat exchange arrangement of claim 1 wherein refrigerant flow cut-off valves are provided at an accessible location within the at least one liquid refrigerant fluid transport line and within the at least one vapor refrigerant fluid transport line at a point near the ground surface in proximity to the sub-surface location of the said at least one liquid refrigerant fluid transport line and at least one refrigerant fluid transport line.

32. The geothermal heat exchange arrangement of claim 1 wherein the at least one refrigerant flow regulator is sized to match the system's compressor's design tonnage capacity.

* * * * *